(12) United States Patent
Jendick

(10) Patent No.: US 6,479,787 B1
(45) Date of Patent: Nov. 12, 2002

(54) LASER UNIT AND METHOD FOR ENGRAVING ARTICLES TO BE INCLUDED IN CANS

(75) Inventor: Manfred Jendick, Recklinghausen (DE)

(73) Assignee: Rexam AB, Malmo (SE)

(*) Notice: Subject to any disclaimer, the term of this patent is extended or adjusted under 35 U.S.C. 154(b) by 0 days.

(21) Appl. No.: 09/482,616

(22) Filed: Jan. 14, 2000

Related U.S. Application Data (62) Division of application No. 09/412,362, filed on Oct. 5, 1999.

(51) Int. Cl.$^7$ ................................ B23K 26/00
(52) U.S. Cl. ............................... 219/121.68
(58) Field of Search ............... 219/121.6, 121.68, 219/121.73, 121.74, 121.75, 121.82

(56) References Cited

U.S. PATENT DOCUMENTS

| | | | |
|---|---|---|---|
| 2,641,998 A | 6/1953 | Donald | |
| 2,648,278 A | 11/1953 | Neander | |
| 3,001,787 A | 9/1961 | Socke | |
| 3,182,994 A | 5/1965 | Huth | |
| 3,549,733 A | 12/1970 | Caddell | |
| 3,626,141 A | 12/1971 | Daly | |
| 3,692,223 A | 9/1972 | Laigle et al. | |
| 3,854,647 A | 12/1974 | Mittendorf | |
| 3,863,823 A | 2/1975 | Allred | |
| 3,898,417 A | 8/1975 | Atkinson | |
| 4,304,981 A | 12/1981 | Gappa | |
| 4,322,016 A | 3/1982 | Barrash | |
| 4,323,755 A | 4/1982 | Nierenberg | |
| 4,363,179 A | 12/1982 | Ruemer, Jr. et al. | |
| 4,375,025 A | * 2/1983 | Carlson | 219/121.68 |

(List continued on next page.)

FOREIGN PATENT DOCUMENTS

| | | |
|---|---|---|
| AU | 81794/94 | 9/1995 |
| CA | 2168435 | 2/1995 |
| CA | 2232871 | 3/1997 |
| DE | 2052 512 | 4/1972 |
| DE | 8900453 | 4/1989 |
| DE | 38 22 097 | 1/1990 |
| DE | 4106151 | 11/1991 |
| DE | 4143339 | 3/1993 |
| DE | 4339321 | 6/1994 |
| DE | 4322252 | 1/1995 |
| DE | 4338774 | 5/1995 |
| DE | 4405203 | 8/1995 |
| DE | 196 39 619 A1 | 3/1997 |
| DE | 19607621 | 9/1997 |

(List continued on next page.)

OTHER PUBLICATIONS

Abstract—JP 0080047784 AA.
Abstract—JP 0080053121 AA.
Culkin & Kugler, "Industrial Laser Processing", The Photonics Design & Applications Handbook, Book 3, 37$^{th}$ International Edition, 1991, pp. H–216–227.

(List continued on next page.)

*Primary Examiner*—Samuel M. Heinrich
(74) *Attorney, Agent, or Firm*—Pillsbury Winthrop LLP (57) ABSTRACT

In a method of manufacturing articles to be included in cans, a metal strip (1) is fed to an article forming unit (11), in which it is punched and stamped to form the articles. Before the article forming operations, the strip (1) is provided with laser engravings on one of its upper and lower surfaces, or on both these surfaces. The laser engravings form indicative marks on the articles.

In addition to the article forming unit (11), an apparatus for manufacturing such articles has a metal strip supply (8), means (13) for feeding the strip (1) and a laser unit (9) for providing the indicative laser engraved marks on the articles.

22 Claims, 6 Drawing Sheets

U.S. PATENT DOCUMENTS

| | | | |
|---|---|---|---|
| 4,380,129 A | | 4/1983 | Barrash |
| 4,405,852 A | | 9/1983 | Bononi |
| 4,431,124 A | | 2/1984 | Campbell et al. |
| 4,459,910 A | | 7/1984 | Taube |
| 4,476,781 A | | 10/1984 | Kubacki et al. |
| 4,517,436 A | | 5/1985 | Lawrence |
| 4,564,739 A | | 1/1986 | Mattelin |
| 4,635,545 A | * | 1/1987 | Kubacki et al. ............... 101/4 |
| 4,675,500 A | * | 6/1987 | Kunz et al. ............ 219/121.73 |
| 4,765,532 A | | 8/1988 | Uomoti et al. |
| 4,880,137 A | | 11/1989 | Wells |
| 4,910,739 A | | 3/1990 | Sheng |
| 5,202,199 A | * | 4/1993 | Mitzutani et al. ........... 429/176 |
| 5,206,496 A | | 4/1993 | Clement et al. |
| 5,215,864 A | | 6/1993 | Laakmann |
| 5,235,454 A | | 8/1993 | Iwasaki |
| 5,248,878 A | | 9/1993 | Ihara |
| 5,329,090 A | | 7/1994 | Woelki et al. |
| 5,465,780 A | | 11/1995 | Muntner |
| 5,552,574 A | * | 9/1996 | Merlin et al. .......... 219/121.69 |
| 5,570,384 A | | 10/1996 | Nishida et al. |
| 5,578,120 A | | 11/1996 | Takahashi et al. |
| 5,593,606 A | | 1/1997 | Owen et al. |
| 5,649,363 A | | 7/1997 | Rankin, IV |
| 5,653,900 A | | 8/1997 | Clement et al. |
| 5,660,516 A | | 8/1997 | Artrip et al. |
| 5,660,747 A | | 8/1997 | Drouillard et al. |
| 5,719,372 A | * | 2/1998 | Togari et al. .......... 219/121.61 |
| 5,782,024 A | | 7/1998 | Pausch |
| 5,817,243 A | * | 10/1998 | Shaffer ........................ 216/65 |
| 5,854,805 A | * | 12/1998 | Reid et al. .................... 372/70 |
| 6,002,098 A | | 12/1999 | Pircher et al. |
| 6,080,958 A | | 6/2000 | Miller et al. |
| 6,160,835 A | | 12/2000 | Kwon |
| 6,163,010 A | | 12/2000 | Kobsa |

FOREIGN PATENT DOCUMENTS

| | | |
|---|---|---|
| DE | 298 16 109 U1 | 11/1998 |
| EP | 0 040 922 A1 | 12/1981 |
| EP | 0 040 929 A1 | 12/1981 |
| EP | 0085484 | 8/1983 |
| EP | 0377915 A2 | 7/1990 |
| EP | 0482776 | 4/1992 |
| EP | 208 175 B1 | 3/1993 |
| EP | 0 618 037 | 10/1994 |
| EP | 0564639 | 4/1997 |
| GB | 2185613 | 7/1987 |
| JP | 58-187091 | 11/1983 |
| JP | 7-53099 A | 2/1995 |
| JP | 8-53121 | 2/1996 |
| WO | WO 93/04943 | 3/1993 |
| WO | WO 95/04342 | 2/1995 |
| WO | WO 97/11288 | 3/1997 |
| WO | WO 98/53949 | 12/1998 |
| WO | WO 99/09853 | 3/1999 |
| WO | WO 00/03832 | 1/2000 |

OTHER PUBLICATIONS

W.M. Steen, "Laser Material Processing", Second Edition, Chapter "6.17. Laser Marking", Springer Verlag, 1998, pp. 263–265, 271.

Dr. A.F.H. Kaplan, EuroLaser Academy, 1996/1997, Section "Laser Marking and Scribing", pp. 1–13.

Brochure entitled "This is PLM Fosie", issued by Swedish Company, PLM Foise AB (mid 1990'; s), p. 6.

JP 07004675, Patent Abstracts of Japan (CD–ROM), Unexamined Applications, vol. 95, No. 1.

JP 07045111, Patent Abstracts of Japan (CD–ROM), Unexamined Applications, vol. 95, No. 2.

JP 04091874, Patent Abstracts of Japan, Abstract of DE 4106151.

Patent Abstracts of Japan, vol. 8, No. 25, E–225 Abstract of JP 58–187091 A (Kanebo K.K.), Nov. 1, 1993.

Japanese Patent Publication No. 61086305 (Abstract Only); May 1, 1986.

* cited by examiner

Prior Art

LASER UNIT AND METHOD FOR ENGRAVING ARTICLES TO BE INCLUDED IN CANS

This is a division of application Ser. No. 09/412,362, filed Oct. 5, 1999.

TECHNICAL FIELD

The present invention generally concerns the technique of manufacturing articles to be included in cans, in particular beverage cans. The invention is specifically, but not exclusively, related to articles in the form of opening tabs to be attached to shells for forming ends to such cans.

BACKGROUND ART

In a brochure entitled "This is PLM Fosie" issued by Applicant's Swedish company PLM Fosie AB in the mid nineties, there is shown on p. 6 how can ends are produced.

In a first production stage, a thin metal strip, preferably a 0.23-mm-thick aluminum strip, is fed to a tab forming unit in which the strip is punched and stamped to form opening tabs integrated with the strip. The tabs are also referred to as opener rings by persons skilled in the art.

In a second production stage, circular shells for forming the can ends are die cut from a thin metal sheet, preferably a 0.23-mm-thick aluminum sheet. Each shell is scored for opening, and a rivet for attachment of the tab is formed at the center of the shell.

In a third production stage, the strip with the integrated tabs are joined with the circular shells in an attachment station, in which the tabs are separated from the strip and attached to the shells by riveting. A finished can end is achieved when the tab is fastened to the shell.

This manufacture of can ends is conventional and well known to the skilled person. It should be mentioned that the whole process is automated with a capacity of about 2,000 ends per line per minute. In the beverage can, industry, the production rate in general is very high and it is a continuous aim to decrease the production costs and the material used for can production, including the ends. Maintenance, tool changes and other downtime should be avoided to keep costs low.

As in other areas of the food and beverage industry, the traceability of the manufacturing and filling of the can is important. Today, there are so-called traceability marks or markings on the cans indicating when the filling took place and also when the main can body was manufactured. Normally, however, there is no traceability marking indicating when the finished can ends were produced. Such markings are often required for reasons of quality. For instance, the peripheral edge of the shell must be precisely formed to ensure a completely tight seam against the upper flange of the can. There are also several functional requirements placed on the tab and on the attachment of the same to the shell.

Thus, there is a need for indicative markings on the tabs and the shells as well as on the can body. The task of providing markings on the tab is especially difficult, resulting in a demand for an improved technique for solving this problem.

Various attempts to provide markings of this type have been made in the past. Indeed one has been successful when it comes to provide markings on the shell, since the shell surfaces available for markings are rather large. Normally, markings of this type are provided in a stamping operation or the like. There is, however, a general problem in using stamping operations to provide small indicative markings on metal surfaces, namely that these surfaces should be non-coated for acceptable results. In some cases, however, it would be desirable to mark surfaces that are coated with lacquer and/or paint.

When it comes to providing markings on the tab, one has not been completely successful due to the small tab surfaces available and the high requirements of elevated production rate. For material saving reasons, the modern opening tabs are quite small, inevitably leaving only very limited tab surfaces for markings at high speed. If such markings are to be provided by stamping operations or the like, the tab surfaces must be increased. However, this calls for costly changes in the production equipment, increases the material cost and involves a risk of non-acceptance by the consumers.

Except for the purpose of indicating the origin of the tabs, the marks on the same may also be used in other contexts. In a commercial aspect, marks on the bottom surface of the tab may indicate the winner in a lottery or the like. The quality requirements on such "promotional" marks are normally the same as in the cases where the origin is indicated. Further, the layout of such "promotional" marks might be changed quite frequently, calling for frequent change of the tooling used for stamping such marks. Since such tooling is quite expensive, the cost for providing "promotional" marks can be considerable.

It is known to use laser for providing identification markings on metal sheets, see for instance U.S. Pat. No. 4,304,981. In this case, however, the markings are used for indicating defects in the manufacture of the metal strips. Thus, the requirements on the markings per se or their positioning are not crucial.

SUMMARY OF THE INVENTION

An object of the present invention is to eliminate the drawbacks mentioned above and to provide an improved technique for manufacturing articles to be included in cans, which articles have distinct and indicative marks.

A further object is to provide an improved technique of marking very limited areas on such articles.

A specific object is that the improved technique for providing marks permits high production rates.

It is also an object to provide an improved technique that allows for frequent changes in the layout of the marks without incurring excessive costs.

Another object is to provide an improved technique of marking such articles yielding satisfactory results on both non-coated and coated surfaces.

It is also a specific object of the invention to provide an improved technique for manufacturing opening tabs for can ends, which tabs have distinct and indicative marks.

These and other objects, which will appear from the following description, have now been achieved by a method, an apparatus, an opening tab, a can end, a shell, a can and use as defined in the appended independent claims. Preferred embodiments of the invention are set forth in the subclaims.

The invention brings out several advantages. An enhanced technique of providing distinct markings on the article is accomplished, also when very limited areas are available for marking, such as on opening tabs. The new technique is suitable for high production rates required in modern beverage can manufacturing. Further, the use of a laser unit permits marking of both non-coated and coated surfaces.

Also, the layout of the marks can easily be changed, for example by input of a new engraving pattern to a control unit, e.g. a computer, that controls the engraving operation performed by the laser unit. Further, since a standard tab can be used, there is no need for tool change in the production line when no laser engravings are desired. The same production line can be used in both cases, since the laser unit in the preferred embodiment is easily disconnectible.

BRIEF DESCRIPTION OF THE DRAWINGS

In the following, presently preferred embodiments of the invention will be described, reference being made to the accompanying schematic drawings.

DESCRIPTION OF PREFERRED EMBODIMENTS

Figure 1:
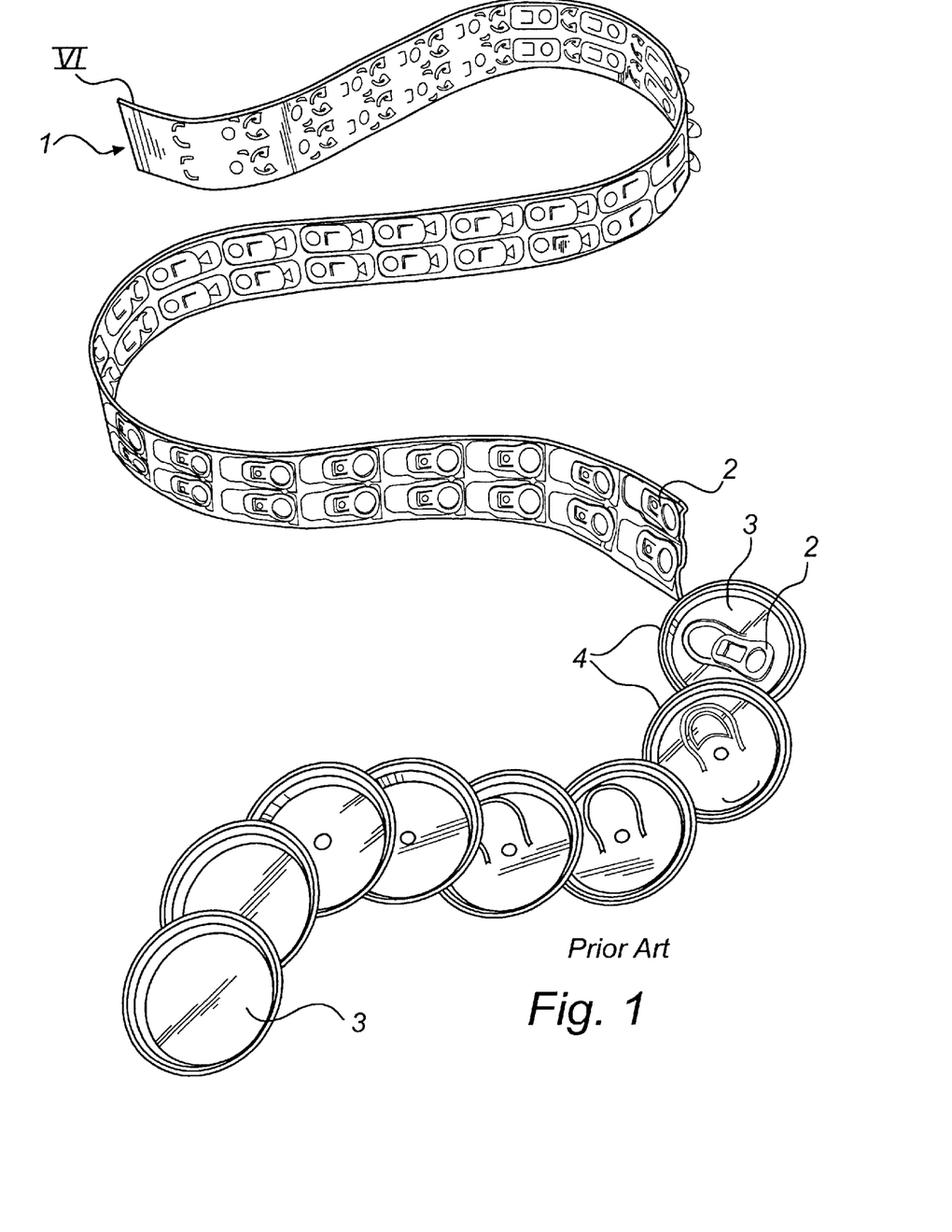
FIG. 1 illustrates the principles of a known method of manufacturing can ends having opening tabs.

In FIG. 1, a thin metal strip 1 is shown which preferably is an aluminum strip having a thickness of about 0.23 mm. The strip 1 is put through various punching and stamping operations in a first production stage in order to form opening rings or tabs 2 integrated with the strip 1.

In another production stage, die-cut metal shells 3, preferably of aluminum sheet having a thickness of about 0.23 mm, are put through various operations for forming a can lid or end 4 which in a final production stage is provided with a tab 2 which is riveted on the top of the shell 3.

Figure 3:
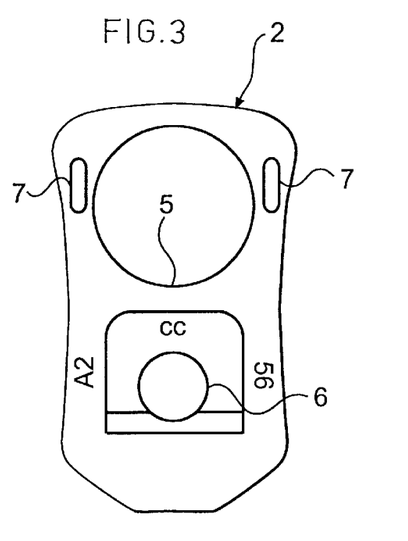
FIG. 3 is a top view of an opening tab according to a preferred embodiment.
Figure 4:
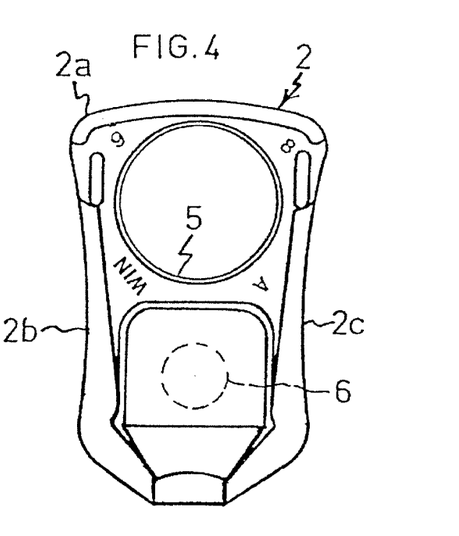
FIG. 4 is a bottom view of a tab having markings on its bottom surface.

As shown in FIGS. 3 and 4, each tab 2 has an opening 5 and a rivet portion 6. In the tab forming operations, the peripheral edge portions 2a, 2b, 2c are bent inwardly in a manner known per se, as shown in FIG. 4. The purpose of this bending is to increase the stiffness of the tab 2. Further, the tab 2 has a stiffening recess 7 on either side of the opening 5, see FIG. 3.

Figure 5:
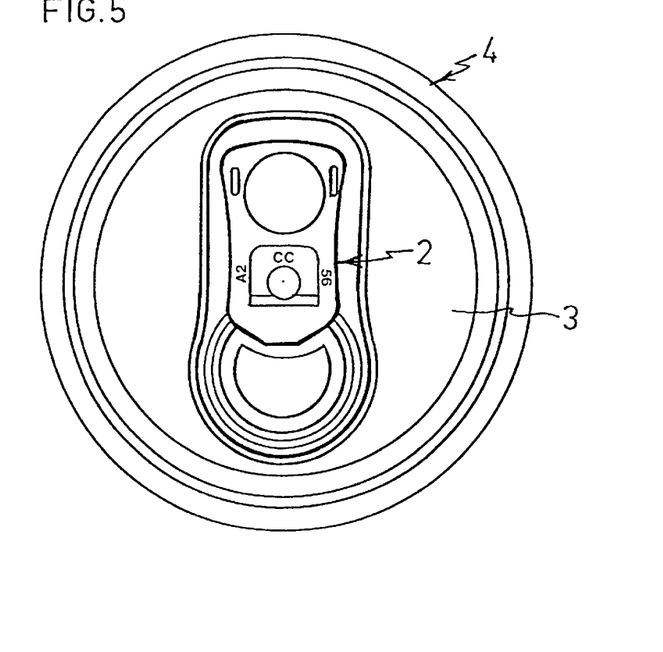
FIG. 5 is a top view of a can end with a tab provided with the markings.

The finished can end 4 provided with a tab 2 riveted on the top surface of the shell 3 is shown in FIG. 5.

Figure 2:
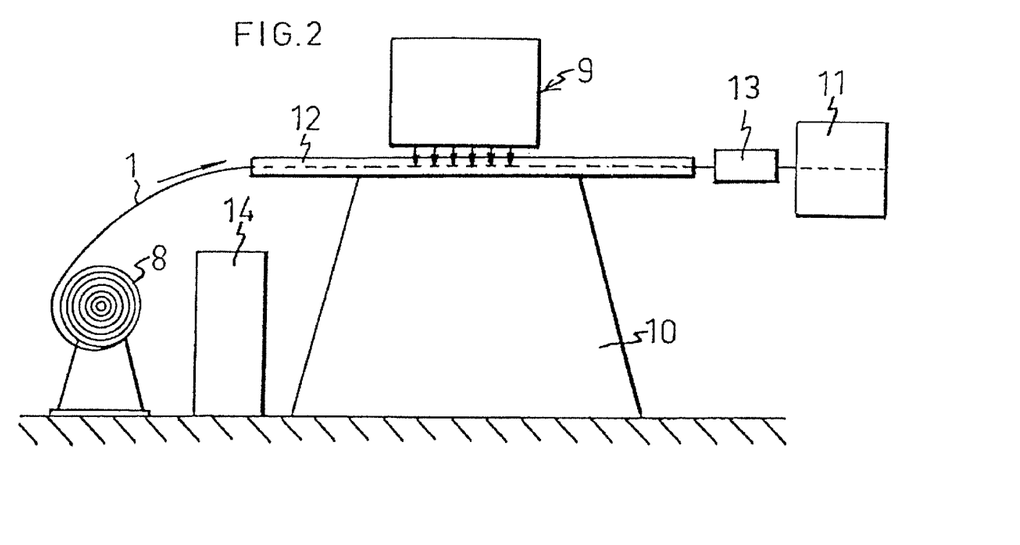
FIG. 2 is a side view of an apparatus according to a preferred embodiment of the invention.

FIG. 2 shows an apparatus for the manufacture of opening tabs 2 corresponding to the working of the strip shown in FIG. 1. An aluminum strip 1 of the type described is fed from a supply 8 to a laser unit 9 supported by a supporting member 10, and finally fed to a tab forming unit 11 which is of a type known per se and which forms the tabs 2 by punching and stamping the strip 1. The strip 1 is guided by a guiding device 12 when passing below the laser unit 9. The strip 1 is fed from the supply 8 by a feeding means 13 arranged in association with the tab forming unit 11. In the tab forming unit 11, the strip 1 is punched and stamped to form the tabs 2 integrated with the strip 1. In this type of apparatus, the strip 1 is only intermittently fed, or indexed, into the tab forming unit 11. Thus, the feeding means 13 is activated to feed the strip 1 after each completed stamping and punching operation in the tab forming unit 11. The feeding rate of the strip 1 and the operation of the laser unit 9 are controlled by a computerised control unit 14 connected to the strip feeding means 13 and means (not shown) for operating the laser unit 9. The laser unit 9, which will be described more in detail below, comprises a high-power and high-speed laser capable of providing engravings in the tab surface, preferably with a depth of about 1–5 $\mu$m. This is illustrated by downwardly directed arrows from the laser unit 9 in FIG. 2, corresponding to laser radiation. The laser unit 9 is thus arranged between the strip supply 8 and the tab forming unit 11. Between the laser unit 9 and the guiding means 12 there can be provided means (not shown) for collecting dust produced in the engraving process. It should be pointed out that the laser unit 9 may be installed in a standard production line for tabs 2. The operation of the laser unit 9 may be disconnected, in which case the tab forming line is used in a conventional manner.

The purpose of the laser unit 9 is to provide indicative, laser engraved markings on at least one of the upper and lower surfaces of the strip 1 depending on whether markings are desired on the top surface or on the bottom surface of the tab 2, or on both these surfaces. The tab 2 shown in FIG. 3 has laser engraved marks A2, CC, 56 on its top surface, whereas the tab 2 in FIG. 4 has laser engraved marks WIN, A, 98 on its bottom surface.

The top markings A2, CC, 56 on the tab 2 shown in FIG. 3 serve as traceability marks indicating when the tab 2 was manufactured. These marks are codified in accordance with a specific system, where A2 is a week code (A–Z= week 1–26, a–z week 27–52), CC is an hour code (A–X= hour 1–24) and 56 is a minute code (1–60). By this code system, it is exactly indicated when the tab 2 was produced.

The bottom markings WIN, A, 98 on the tab 2 shown in FIG. 4 serve as indications of a lottery, where the mark WIN indicates that the person who opens the can by means of the tab 2 is a winner. The other marks on the tab A, 98 constitute an identification of the lottery in question.

In FIG. 5, the tab 2 shown in FIG. 3. is attached to the top of the shell 3. Thus, the end 4 is finished and the tab 2 has traceability markings A2, CC, 56 clearly readable for a person wishing to investigate the quality of the end 4 and/or the marked tab 2.

Figure 6:
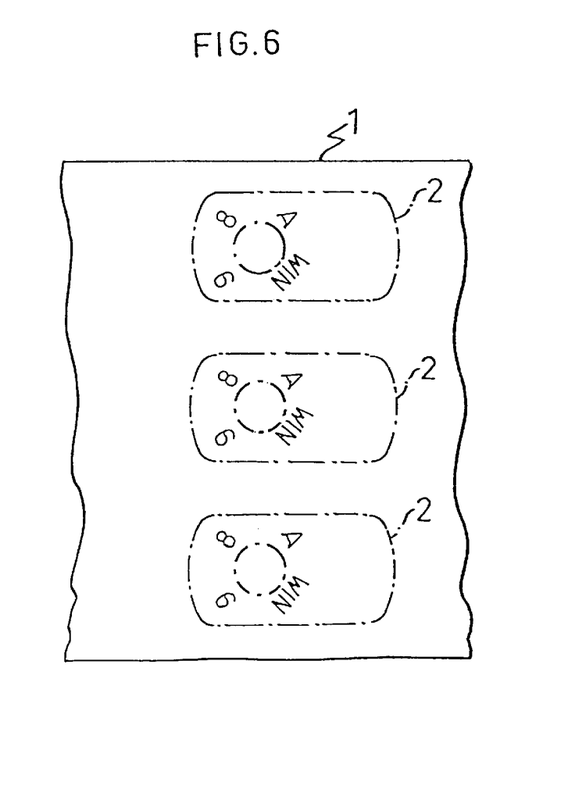
FIG. 6 is a plan view of a portion of a metal strip used for producing tabs in accordance with the invention.

FIG. 6 shows a portion of the strip 1 after the laser engraving operation, and before the tab forming unit 11. The strip portion shown in FIG. 6 basically corresponds to the position marked VI in FIG. 1. The laser unit 9 has engraved the markings WIN, A, 98 on one surface of the strip 1. The approximate periphery of the tab to be produced in the following tab forming steps in the unit 11 has been indicated with ghost lines in FIG. 6. In practice, the size of the laser engraved marks is about 1.4×1.2 mm, which makes them easily readable.

Figure 7:
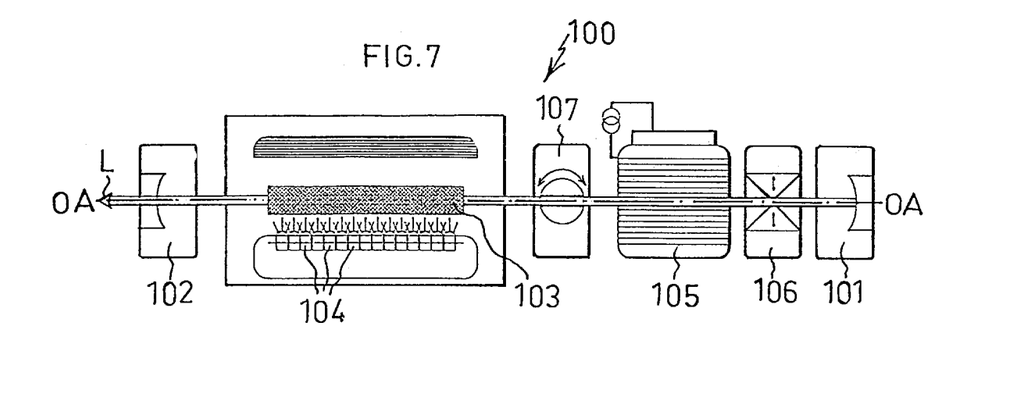
FIG. 7 is schematic view of a first part of a laser unit according to a preferred embodiment of the invention.
Figure 8:
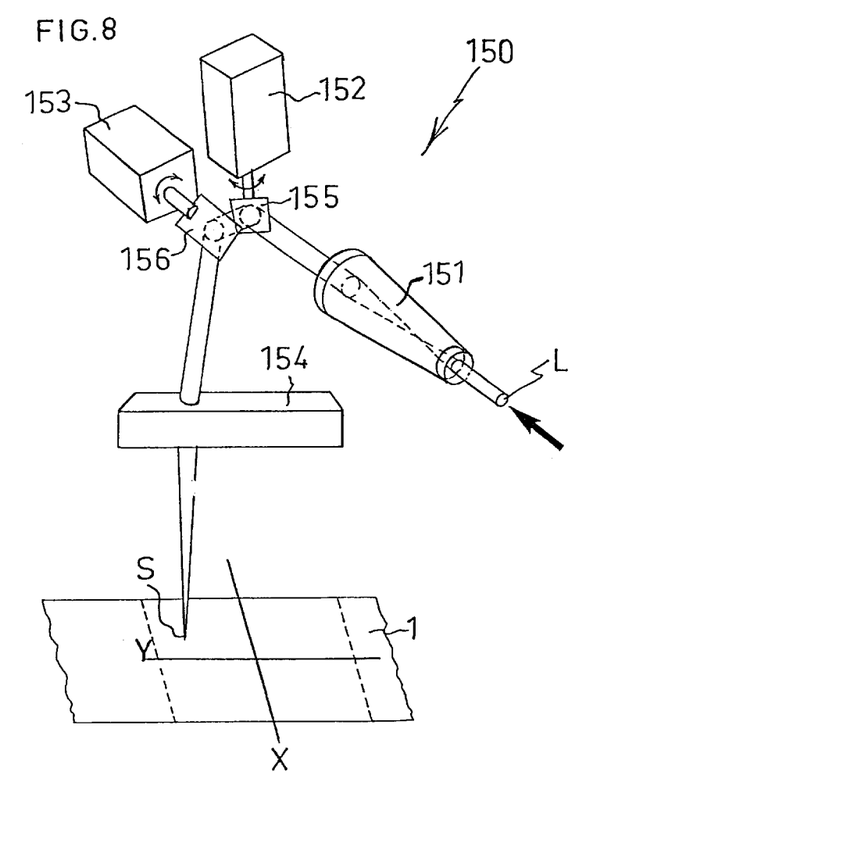
FIG. 8 is a perspective view of a second part of a laser unit according to a preferred embodiment of the invention.

In the following, the laser unit 9 will be described in some detail with reference to FIGS. 7–8. Generally, the laser unit 9 comprises a laser 100, which is adapted to generate laser radiation in the form of a beam L at a suitable wavelength, and a so-called scanner head 150, which is adapted to receive the laser beam L from the laser 100, and focus and direct the generated laser beam L to a given location S on the strip surface. The laser 100 and the scanner head 150 are shown in FIG. 7 and FIG. 8, respectively. The requirements on the laser unit 9 are high in the sense that the laser engraved marks must be provided in an extremely short time due to the high feeding rate of the strip 1. The laser radiation also has to be very accurate positioned on the strip 1, since the tab surface available for the markings is very small.

It is preferred that the laser 100 generates radiation in the near IR region of approximately 1–10 $\mu$m since aluminum, normally used for manufacture of cans, exhibits high absorption of radiation in this region.

In is also preferred that the laser engraving operation takes place during the time period when the tab forming unit 11 performs a stamping and punching operation, i.e. when the strip 1 is in an immobilised condition. Thus, the scanner head 150 should be capable of focusing the laser radiation to a small spot and control the position of this spot in two dimensions on the strip surface.

Further, it is preferred that the laser 100 is capable of generating pulsed laser radiation, since the maximum power of a laser pulse can be many times the rated power of the laser. This will increase the engraving efficiency of the laser unit 9.

In the most preferred embodiment, shown in FIG. 7, the laser 100 is a Nd:YAG laser generating radiation at 1.064 $\mu$m, and in particular a diode laser pumped Nd:YAG laser since this laser is capable of generating laser radiation with good mode quality. Thus, the radiation can be focused to a minute volume producing very distinct engravings. Compared to a conventional flash-lamp pumped Nd:YAG laser, the diode laser pumped Nd:YAG laser also has a high electrical to optical efficiency and, thus, less need for cooling.

The laser 100 of FIG. 7 outputs a laser beam L which is generated in an optical cavity defined by a highly reflecting rear mirror 101 and a partially reflecting (R≈80%) front mirror 102. A lasing medium 103 of Nd:YAG is arranged on the optical axis OA of the cavity and is surrounded by diode lasers 104 for pumping of the medium 103. A so-called Q-switch 105, e.g. a Pockels cell, is arranged in the cavity in a manner known per se, for generating intense lasing in a very short time period resulting in very high peak power laser pulses. A mode selection element 106, e.g. an iris diaphragm, is arranged within the laser cavity to block outer portions of the laser beam L in order to optimise its transverse mode characteristics. Thus, the laser can be forced to operate in a transverse mode that can be focused to a small volume, e.g. TEM$_{00}$. A shutter 107 is provided for blanking off the laser beam L.

Excellent results have been achieved in practice by a modified version of a diode laser pumped Nd:YAG laser (DynaMark T2) marketed by the German company IWKA. The laser emits pulses with a duration of 25 ns in a cycle time of approximately 0.1–1 $\mu$s. The average power per pulse is 25 kW, with a peak pulse power of about 100 kW. This laser power is adequate for engraving colored metal surfaces, but should be increased when engraving bare metal surfaces.

The scanner head 150 of FIG. 8 receives the laser beam L from the laser 100 and focuses it to a small spot S on the surface of the strip 1. The scanner head 150 comprises a telescope 151 for beam expansion, two deflection devices 152, 153 for beam deflection, and a lens arrangement 154 for beam focusing. The laser beam L is first directed through the telescope 151 to increase the beam diameter. This will reduce the beam power per unit area to minimise damages to successive optical components and to optimise the beam size on the lens arrangement 154. Further, the size of the focal spot S on the strip surface will decrease by this procedure.

Each deflection device 152, 153 controls the deflection of the laser beam in one respective direction (x, y). By the combined action of the two deflection devices 152, 153, the laser beam L can be controlled in two dimensions over the strip surface. The deflection devices 152, 153, as well as the laser 100, are operated by a control means (not shown) which in turn is controlled by the computerised control unit 14 (FIG. 2). Preferably, the deflection devices 152, 153 are galvanometers of a type known per se, in which the rotation of a mirror 155, 156 is controlled by means of an electromagnetic field and feedback control.

After passing the deflection devices 152, 153 the laser beam is directed through the lens arrangement 154, preferably a so-called flat-field lens. Such a flat-field lens is designed to focus the laser beam L perpendicular to a geometrical plane, in this case the strip surface. The focal length of the flat-field lens should be chosen with great care. With a large focal length, a small rotation of the mirrors 155, 156 will yield a large movement of the focal spot S on the strip surface, thereby allowing for fast displacement of the spot S. However, a too large focal length will yield a low precision in the positioning of the spot S as well as a larger spot size. A focal length of 120–180 mm has been found adequate.

As shown in FIG. 4, the markings are laser engraved on the tab surface between the opening 5 and the inwardly bent edge portions 2a, 2b and 2c provided by bending means (not shown) included in the tab forming unit 11. As explained above, the laser unit 9 must be controlled very accurately by means of the control unit 14 in order to provide distinct laser engraved markings on this small surface of the tab 2. The positioning control of the focal spot S is important. Since there is a continuous aim to reduce the strip material used, the width of the tab 2 should be as small as possible, thus leaving only a limited surface for markings. By the high-power laser engraving according to the invention, distinct and indicative markings are provided on the tab 2 in spite of the small tab surface available.

The provision of laser engravings on a limited surface also calls for careful positioning of the strip 1 during the engraving operation. Due to the indexing motion of the strip 1 into the tab forming unit 11, the strip 1 will swing and jump in all directions on its way from the supply 8 to the tab forming unit 11. To control the position of the strip 1, a guiding device 12 is arranged in the area of the engraving operation. This guiding device 12 should allow for careful positioning of the strip 1, but should not interfere with the intermittent progression of the strip 1 into the tab forming unit 11. Preferably, the strip 1 should not be clamped during the laser engraving operation, since this might disturb the indexing motion of the strip 1 or lead to stretching of the strip 1. Also, friction must be minimised. Typically, the strip 1 should be positioned with a precision of about 15 $\mu$m in the lateral, or transverse, direction, at least when providing marks on the surface of the tabs 2. The vertical position of the strip 1 should also be carefully controlled within the focal region of the laser beam, typically about 0.2 mm.

Figure 9:
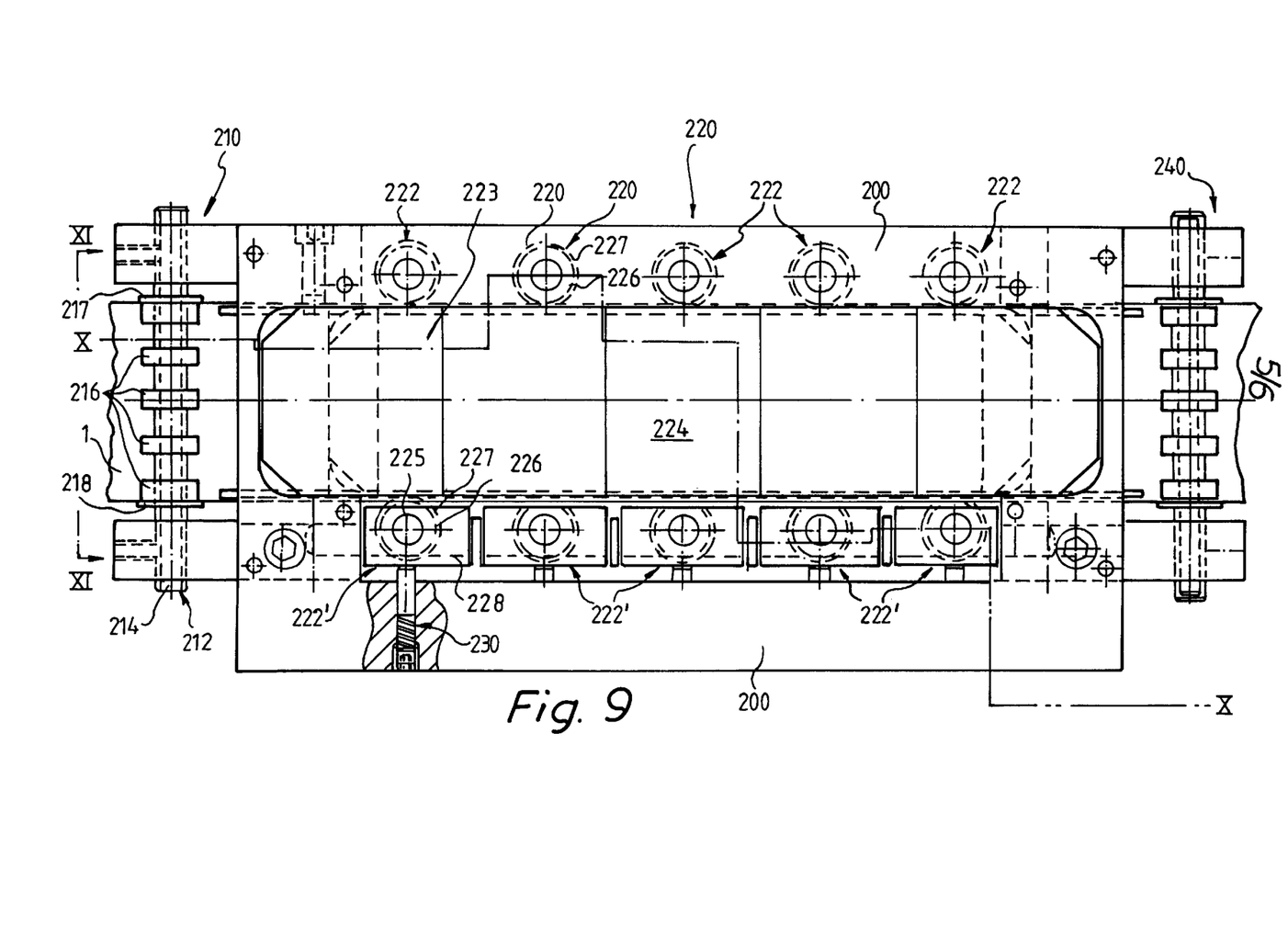
FIG. 9 is a plan view of a strip guiding device according to a preferred embodiment of the invention.
Figure 10:
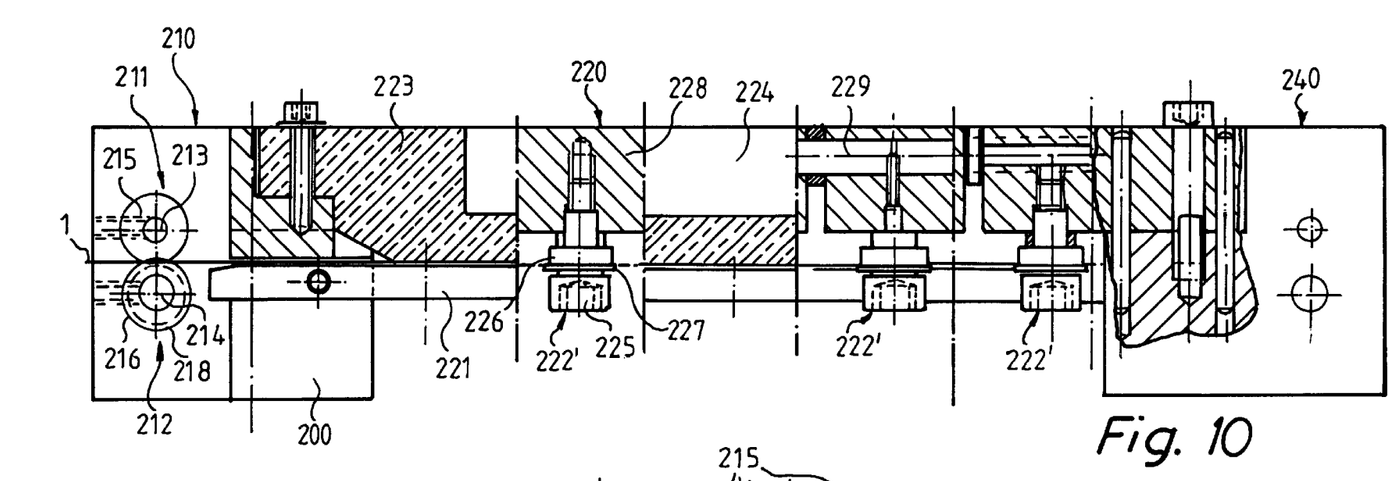
FIG. 10 is a cross-sectional view taken along the line X—X in FIG. 9.
Figure 11:
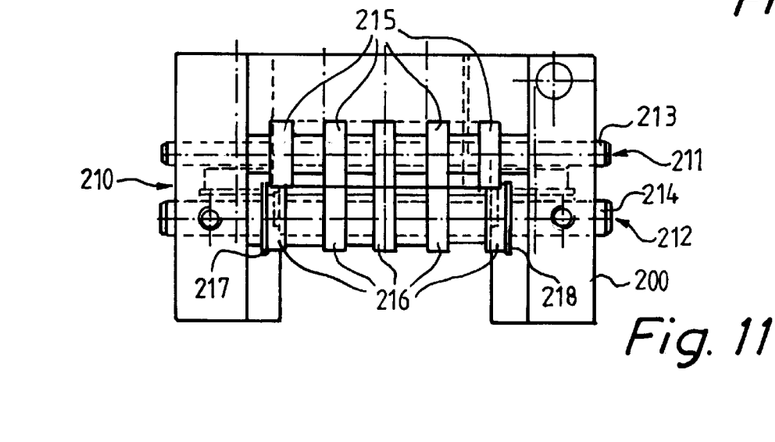
FIG. 11 is an end view taken in the direction of the arrows XI—XI in FIG. 9.

In FIGS. 9–11, a strip guiding device is shown that fulfills the above criteria.

The guiding device 12 comprises a main block 200, an intake mechanism 210, a guiding channel 220, and an outlet mechanism 240.

The intake mechanism 210 includes first and second intake rollers 211, 212, each comprising a spindle 213, 214 having a number of cylindrical, laterally spaced radial projections 215, 216. The intake rollers 211, 212 are arranged to receive the strip 1 with the projections 215, 216 abuttingly engaging the upper and lower surfaces of the strip 1, respectively. Each spindle 213, 214 is mounted in the main block 200 for free rotation therein. The clearance between the intake rollers 211, 212 corresponds to the thickness of the strip 1 with nearly zero tolerance, in order to avoid a twisting motion of the incoming strip 1 being transmitted to the strip portion received in the guiding channel 220. The second spindle 214 is provided with guiding shoulders 217, 218 with a mutual distance essentially corresponding to the width of the strip 1, typically with a tolerance of about 0.5 mm.

The guiding channel 220 is defined by a guiding shoe 221, a number of guiding elements 222, 222' arranged in the longitudinal direction on both sides of the channel 220, and a guiding cover 223. The distance between the guiding shoe 221 and the guiding cover 223 is such that the strip 1 can move essentially without interference. An opening or window 224 is defined in the cover 223 so that the strip surface is accessible for engraving by means of the laser unit 9. The guiding elements 222 on a first side of the channel 220 are mounted for rotation at a fixed location in the main block 220, whereas the guiding elements 222' on a second, opposite side of the channel 220 are mounted for both rotation and lateral displacement in the main block 200. Each guiding element 222, 222' comprises a rotatable guiding roller 225 which has a cylindrical portion with a circumferential surface 226 for abutment on the longitudinal edges of the strip 1 and an adjacent circumferential shoulder 227 for defining the path of the strip 1 in the vertical direction. The displaceable guiding elements 222' further comprises a mounting block 228, which receives the guiding roller 225 and is displaceably arranged on a common pin 229 extending in the longitudinal direction of the guiding device 12. Spring-biased pusher arrangements 230 are arranged to urge the guiding elements 222' towards the first side of the channel 220. Typically, the mounting block 228 allows for a movement of ±3 mm in the lateral direction. As an alternative (not shown), all guiding elements 222, 222' can be displaceable and biased towards the center of the channel 220.

The outlet mechanism 240 corresponds to the intake mechanism 210 and will not be further described.

The strip guiding device 12 as described above and shown in FIGS. 9–11 forms a self-adjusting system for careful positioning of the strip 1 during the laser engraving operation. The strip 1 is only subjected to guiding forces at its longitudinal edges. Therefore, the friction between the guiding device and the strip 1 is minimal, and the indexing movement of the strip 1 is essentially undisturbed. Another advantage is that a large area of the strip surface can be accessible for laser engraving.

In order for the tab forming unit 11 to form each tab from the intended portion of the strip 1 (cf. the laser-engraved areas marked by ghost lines in FIG. 6), the engraving operation should be effected as close as possible to the tab forming operation. However, the laser unit 9 should preferably be physically unconnected to the tab forming unit 11 due to the excessive vibrations produced in the latter.

Preferably, a sensor (not shown) is arranged in association with the tab forming unit 11 or the strip feeding means 13. The sensor is adapted to indicate when the strip 1 is in an immobilised condition, e.g. by sensing a dwell condition of the tab forming unit 11 or the strip feeding means 13. The output signal of the sensor is fed to the laser unit 9 to initiate the laser engraving operation on the surface of the immobilised strip 1.

The laser unit 9 is disconnectible, which makes it possible to use the apparatus as a standard production line as well, even temporarily. If markings are desired on both sides of the tab 2, another laser unit (not shown) could be arranged facing the lower surface of the strip 1. In this case, the guiding device should be modified, by substituting the guiding shoe for a guiding cover with a window.

In one aspect of the invention, use is made of laser in the production of opening tabs 2 to be attached to shells 3 for forming can ends 4, whereby the laser provides engravings on a metal strip 1 from which the tabs 2 are formed. The use of the laser must be carefully controlled in order to obtain the laser engravings exactly where needed on the strip 1 so as to obtain the markings exactly on the intended surface of the tab 2, at high production rate.

In the illustrated embodiment, the apparatus effects the laser engraving operation during the dwell time of the strip feeding means 13. This provides for excellent control of the strip position during engraving as well as a high production rate of laser-engraved tabs. Typically, the tab production unit 11 operates at a speed of 640 strokes/min or higher, with the strip 1 being immobilised during approximately 60 ms. In this time, the inventive apparatus is capable of providing three laterally spaced tab-forming strip portions with six laser-engraved letters each, the letters having a height of 2 mm (cf. FIG. 6).

This should be compared to an alternative approach of effecting the engraving operation during movement of strip (not shown). In this case, the scanner head provides for beam deflection in the lateral (x) direction only. Thus, only longitudinally spaced tab-forming strip portions can be engraved with this approach, leading to a reduced production rate. Further, it is more difficult to control the position of the strip during movement thereof. In addition, the engraving operation can only be effected while the strip is being fed at constant speed, i.e. during approximately 15 ms when the tab production unit 11 operates at a speed of 640 strokes/min. Thus, the strip feeding means 13 must be capable of accelerating the strip to high speeds. However, in some cases this alternative, less preferred approach might be sufficient. It should also be mentioned that a cw $CO_2$ laser could be used in this approach, although the focal spot S will be comparatively large since the laser has non-optimum mode characteristics and yields radiation at a longer wavelength (10.6 μm).

Finally, it should be emphasised that the invention by no means is restricted to the embodiments described in the foregoing, and modifications are feasible within the scope of the appended claims. In particular, it should be pointed out that the specific design of the can end is not crucial as long as the aimed-at laser engraved markings are provided on the tab to be attached thereto.

It should also be mentioned that the tabs 2 could be formed in the tab forming unit 11 by other means than stamping and punching operations.

The invention could also be used for laser engraving of other articles to be included in a can, for example the above-mentioned shell or the can body.

What is claimed is:

1. A laser unit which provides laser engravings on a continuous strip of metal that is fed to an article forming unit that forms articles to be included in cans, said laser unit comprising:
   a diode laser pumped Nd:YAG laser that generates a high quality beam of laser radiation in the near IR wavelength range, the Nd:YAG laser including a laser cavity and a mode selection element arranged in connection with the laser cavity for obtaining suitable laser mode characteristics,
   a flat-field lens that focuses the laser beam onto a surface of said strip,
   a beam expander that increases a diameter of the laser beam emitted from the Nd:YAG laser, said beam expander being arranged upstream of the flat-field lens, and
   a beam deflector which effects a controlled deflection of the laser beam in two mutually perpendicular directions, said beam deflector being arranged intermediate the beam expander and the flat-field lens,
   wherein the laser unit is controlled to provide, at high production rate, said laser engravings at exact locations on the surface of the strip when said strip intermittently is in an immobilized condition before being fed into the article forming unit.

2. A laser unit as set forth in claim 1, which is arranged to provide about 1–5 μm deep engravings in said surface of said strip.

3. A laser unit as set forth in claim 1, wherein the Nd:YAG laser provides pulsed laser radiation.

4. A laser unit as set forth in claim 1, wherein the laser mode characteristics are TEMxx laser mode characteristics.

5. A laser unit as set forth in claim 4, wherein said mode selection element defines an aperture of variable diameter and being arranged to selectively transmit a portion of the laser beam.

6. A laser unit as set forth in claim 1, wherein the flat-field lens has an effective focal length of approximately 120–180 mm.

7. A laser unit as set forth in claim 1, wherein the laser unit operation is not connected to the article forming unit.

8. A laser unit as set forth in claim 1, wherein said laser unit is operable to provide 18 laser-engraved characters on said surface in approximately 60 milliseconds, each character having a height of 2 millimeters.

9. A laser unit which provides laser engravings on a surface of a continuous strip of metal that is fed to an article forming unit that forms the strip into articles to be included in cans, the laser unit comprising:
   a diode laser pumped Nd:YAG laser that generates a high quality beam of laser radiation in the near IR wavelength range, and
   a scanner in communication with the Nd:YAG laser, the scanner expanding a diameter of the beam and focusing the beam onto a surface of the strip, the scanner including a beam deflector that effects a controlled deflection of the laser beam in two mutually perpendicular directions, said controlled deflection occurring between expanding the diameter of the beam and focusing of the beam on the surface of the strip,
   wherein the Nd:YAG laser is controlled to provide, at high production rate, said laser engravings at exact locations on the surface of the strip.

10. A laser unit which provides laser engravings on a continuous strip of metal that is fed to an article forming unit that forms the strip into articles to be included in cans, said laser unit comprising:
   a laser that generates a high quality beam of laser radiation in the near IR wavelength range of approximately 1–10 μm,
   a flat-field lens that focuses the laser beam onto a surface of said strip, the laser beam emitted from the laser being expanded before the flat-field lens focuses the laser beam onto the surface of the strip, and
   a beam deflector that effects a controlled deflection of the laser beam in two mutually perpendicular directions after the diameter of the beam is expanded, said beam deflector being arranged upstream of the flat-field lens,
   wherein the laser is controlled to provide, at high production rate, said laser engravings at exact locations on the surface of the strip.

11. A laser unit which provides laser engravings on a continuous strip of metal that is fed to an article forming unit that forms the strip into articles to be included in cans, said laser unit comprising:
   a laser that generates a beam of laser radiation in the near IR wavelength range, the laser including a laser cavity and a mode selection element arranged in connection with the laser cavity for obtaining suitable laser mode characteristics, the beam being focused onto a surface of said strip, a diameter of the laser beam emitted from the laser being expanded before the beam is focused, and
   a beam deflector that effects a controlled deflection of the laser beam in two mutually perpendicular directions after the diameter of the beam is expanded and before the beam is focused onto the surface of the strip,
   wherein the laser is controlled to provide, at high production rate, said laser engravings at exact locations on the surface of the strip.

12. A laser unit which provides laser engravings on a continuous aluminum strip that is fed to an article forming unit that forms the strip into articles to be included in cans, said laser unit comprising:
   a laser that generates a high quality beam of laser radiation in the near IR wavelength range of approximately 1–10 μm in which the aluminum strip exhibits a high absorption rate of the laser radiation, the laser being controlled to provide, in a period of about 60 ms, laser engravings having a depth of about 1–5 μm at exact locations on a surface of the aluminum strip, the laser engravings including 18 laser engraved characters each having a height of about 2 mm.

13. A method for providing laser engravings on a continuous strip of metal that is fed to an article forming unit that forms the strip into articles to be included in cans, said method comprising:
   using a diode laser pumped Nd:YAG laser, generating a high quality beam of laser radiation in the near IR wavelength range,
   providing the Nd:YAG laser with a laser cavity and a mode selection element arranged in connection with the laser cavity for obtaining suitable laser mode characteristics,
   focusing the laser beam onto a surface of said strip, and
   at high production rate, engraving the surface of the strip at exact locations.

14. A method as set forth in claim 13, wherein the step of engraving the surface of the strip at exact locations is carried out when the strip is in an immobilized condition.

15. A method for providing laser engravings on a surface of a continuous strip of metal that is fed to an article forming unit that forms the strip into articles to be included in cans, said method comprising:

using a diode laser pumped Nd:YAG laser, generating a high quality beam of laser radiation in the near IR wavelength range, expanding a diameter of the beam, focusing the beam onto a surface of the strip, effecting a controlled deflection of the laser beam in two mutually perpendicular directions, said controlled deflection occurring after the diameter of the beam is expanded and before the beam is focused, and at high production rate, engraving the surface of the strip at exact locations.

16. A method as set forth in claim 15, wherein the step of engraving the surface of the strip at exact locations is carried out when the strip is in an immobilized condition.

17. A method for providing laser engravings on a continuous strip of metal that is fed to an article forming unit that forms the strip into articles to be included in cans, said method comprising:

generating a high quality beam of laser radiation in the near IR wavelength range of approximately 1–10 $\mu$m, focusing the laser beam onto a surface of said strip, the laser beam being expanded before the laser beam is focused onto the surface of the strip, effecting a controlled deflection of the laser beam in two mutually perpendicular directions after the diameter of the beam is expanded and before the beam is focused on the surface of the strip, and at high production rate, laser engraving the surface of the strip at exact locations.

18. A method as set forth in claim 17, wherein the step of laser engraving the surface of the strip at exact locations is carried out when the strip is in an immobilized condition.

19. A method for providing laser engravings on a continuous metal strip that is fed to an article forming unit that forms the metal strip into articles to be included in cans, said method comprising:

using a laser, generating a high quality beam of laser radiation in the near IR wavelength range, obtaining laser mode characteristics of the laser that are suitable for the metal strip, focusing the beam onto said surface of said metal strip, a diameter of the laser beam emitted from the laser being expanded before the beam is focused, effecting a controlled deflection of the laser beam in two mutually perpendicular directions before the diameter of the beam is expanded and after the beam is focused onto the surface of the metal strip, and at high production rate, laser engraving the surface of the metal strip at exact locations.

20. A method as set forth in claim 19, wherein the step of laser engraving the surface of the strip at exact locations is carried out when the strip is in an immobilized condition.

21. A method for providing laser engravings on a continuous strip of aluminum that is fed to an article forming unit for forming the strip into articles to be included in cans, said laser unit comprising:

using a laser unit, generating a beam of laser radiation in the near IR wavelength range of approximately 1–10 $\mu$m in which the aluminum strip exhibits a high absorption rate of the laser radiation, and controlling the laser unit to provide, in a period of about 60 ms, laser engravings having a depth of about 1–5 $\mu$m at exact locations on the surface of the aluminum strip, the laser engravings including 18 laser engraved characters each having a height of about 2 mm.

22. A method as set forth in claim 21, wherein the laser engravings are provided in the surface of the strip when the strip is in an immobilized condition.

* * * * *

UNITED STATES PATENT AND TRADEMARK OFFICE
CERTIFICATE OF CORRECTION

PATENT NO. : 6,479,787 B1   Page 1 of 1
DATED : November 12, 2002
INVENTOR(S) : Jendick It is certified that error appears in the above-identified patent and that said Letters Patent is hereby corrected as shown below:

<u>Title page,</u>
After Item [22], the following should be added:
-- Foreign Application Priority Data
[30]    Apr. 28, 1998[SE]    9801489 --

Item [62], should read:
-- [62]   Division of application No. 09/412,362, filed on Oct. 5,1999, which is a continuation of PCT/SE99/00692, filed on April 28, 1999. --

Signed and Sealed this

Fifth Day of August, 2003

JAMES E. ROGAN
*Director of the United States Patent and Trademark Office*